T. J. MAYALL.
RUBBER HOSE OR TUBING.
No. 88,887.　　　　　　　Patented Apr. 13, 1869.
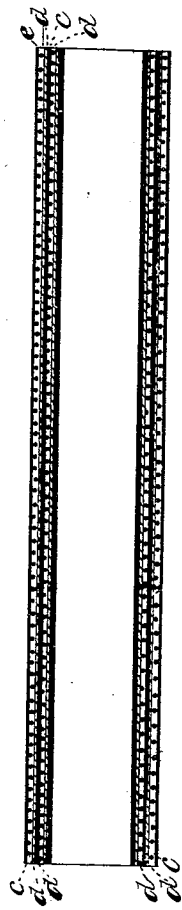
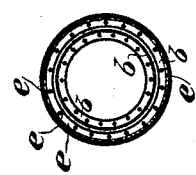
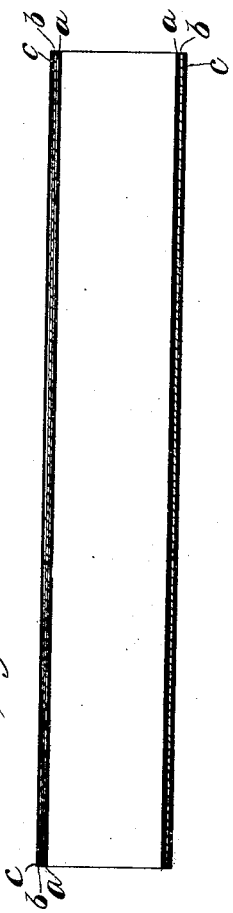
Witnesses:
Joseph Gavett
Frederic A. Sayer
Inventor:
Thos. J. Mayall

UNITED STATES PATENT OFFICE.

THOMAS J. MAYALL, OF ROXBURY, MASSACHUSETTS.

IMPROVED RUBBER HOSE OR TUBING.

Specification forming part of Letters Patent No. 88,887, dated April 13, 1869.

*To all persons to whom these presents shall come:*

Be it known that I, THOMAS J. MAYALL, of Roxbury, in the county of Suffolk and State of Massachusetts, have invented a new and useful Improvement in the Manufacture of Rubber Hose or Tubing; that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

The ordinary india-rubber or gutta-percha hose is formed usually of sheets of cloth coated with india-rubber or gutta-percha, wound around a mandrel, and then vulcanized.

Another kind of hose is made by winding the sheets of cloth, covered with a vulcanizable compound of india-rubber or gutta-percha, spirally upon a mandrel of the same size as the required bore of the hose.

Another kind of hose is formed of a seamless woven tube composed of fibrous materials, and lined with a coating or tube of india-rubber or gutta-percha.

In these and the various other kinds of hose the most serious difficulty to be overcome has been that sufficient strength could not be obtained without making the hose too bulky and clumsy.

By my improvements I have produced a hose which combines both lightness and strength.

In the use of all hose or tubing, as heretofore constructed, great strain in a longitudinal direction is exerted therein when the pressure of the liquids passing through is first received upon the same, giving the hose or tubing a sudden strain and elongation. I provide for this difficulty by forming a hose with longitudinal binders of thread, wire, twine, &c., inserted between and by the plies or layers composing the hose. I also combine with the above strands or threads wound, twisted, or braided around the said longitudinal binders and the layer or layers of the hose, thus forming a hose which is extremely strong in both a transverse and longitudinal direction.

My improved hose is represented in the accompanying drawings, of which—

Figure 1 is a longitudinal vertical section, showing both the transverse and longitudinal binding-threads. Fig. 2 is a transverse vertical section of the same. Fig. 3 is a longitudinal vertical section, showing only longitudinal binding-threads.

One convenient mode of preparing my improved hose I will now proceed to explain in detail.

I take a mandrel, of suitable size for the required bore of the hose, and slip over the same a tube or lining of india-rubber or gutta-percha, *a a*, formed in any proper manner.

The tube may be covered with cement, if desirable.

Longitudinal binders *b b*, of thread, wire, or narrow strips of cloth, are then fastened in any proper manner to the periphery of the tube *a a*, along their whole length or at the two ends. Another tube, of rubber or gutta-percha, *c c*, may then be slipped over the first tube, *a a*, and the binders *b b* and the tubes *a a* and *c c* run through rollers to press them together. The whole may then be vulcanized by any of the modes practiced by rubber-manufacturers.

In Figs. 1 and 2, the hose or tube has first applied to it the longitudinal binding-threads, as above described, and is then wound or braided around with transverse threads or strands *d d*, &c., which bind the whole closely together. Another tube, *e e*, may then be slipped over the whole, and any number of plies added in a similar manner to these described, according to the size and strength of hose required.

Having thus described my new improvement, I will state my claim as follows:

What I claim as my invention, and desire to have secured to me by Letters Patent, is—

1. A hose or tubing in which longitudinal binders of thread, wire, twine, &c., or their equivalents, are inserted between the different layers or plies composing the same, substantially as described, for the purpose of preventing strains upon the hose or tubing in a lengthwise direction, as set forth.

2. I also claim a hose or tubing in which longitudinal binders of thread, wire, twine, &c., or their equivalents, are inserted between the different layers or plies composing the same, and strands of the said materials wound, twisted, or braided around the said longitudinal binders and layer or layers of the hose or tubing, as set forth.

THOS. J. MAYALL.

Witnesses:
ALBERT W. BROWN,
FREDERIC A. SAYER.